United States Patent
Hathaway et al.

(10) Patent No.: US 9,605,219 B2
(45) Date of Patent: Mar. 28, 2017

(54) SOLAR GASIFIER

(71) Applicant: Regents of the University of Minnesota, St. Paul, MN (US)

(72) Inventors: Brandon J. Hathaway, Minneapolis, MN (US); Jane H. Davidson, Wayzata, MN (US); Wojciech Lipinski, Reid (AU); David B. Kittelson, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 654 days.

(21) Appl. No.: 13/762,075

(22) Filed: Feb. 7, 2013

(65) Prior Publication Data

US 2013/0199093 A1   Aug. 8, 2013

Related U.S. Application Data (60) Provisional application No. 61/595,779, filed on Feb. 7, 2012.

(51) Int. Cl.
| | |
|---|---|
| *C10J 3/72* | (2006.01) |
| *C10J 3/57* | (2006.01) |
| *F24J 2/07* | (2006.01) |

(52) U.S. Cl.
CPC . *C10J 3/72* (2013.01); *C10J 3/57* (2013.01); *F24J 2/07* (2013.01); *C10J 2300/092* (2013.01); *C10J 2300/0916* (2013.01); *C10J 2300/0976* (2013.01); *C10J 2300/1292* (2013.01); *Y02E 10/41* (2013.01)

(58) Field of Classification Search
CPC .............................................. C10J 2300/1284
See application file for complete search history.

(56) References Cited

U.S. PATENT DOCUMENTS

| | | | |
|---|---|---|---|
| 3,252,773 A | 5/1966 | Solomon | |
| 3,708,270 A | 1/1973 | Birk | |
| 3,993,458 A * | 11/1976 | Antal, Jr. | .................. C10J 3/54 |
| | | | 126/714 |
| 4,149,856 A * | 4/1979 | Keller | ........................ C10J 3/20 |
| | | | 126/681 |
| 4,229,184 A | 10/1980 | Gregg | |
| 4,290,779 A | 9/1981 | Frosch et al. | |
| 4,415,339 A | 11/1983 | Aiman et al. | |
| 4,455,153 A | 6/1984 | Jakahi | |
| 5,647,877 A | 7/1997 | Epstein | |
| 2008/0086946 A1 | 4/2008 | Weimer et al. | |

OTHER PUBLICATIONS

Hathaway, B. J. et al., "Solar Gasification of Biomass: Kinetics of Pyrolysis and Steam Gasification in Molten Salt", *Journal of Solar Energy Engineering*, 133, (2011), 021011-1-021011-9.

* cited by examiner

*Primary Examiner* — Matthew Merkling
(74) *Attorney, Agent, or Firm* — Schwegman Lundberg & Woessner, P.A.

(57) ABSTRACT

In various embodiments, the present invention provides a reaction chamber, including a catalyst, and a heating chamber configured to receive light. The heating chamber is positioned underneath at least a portion of the reaction chamber.

20 Claims, 6 Drawing Sheets

SOLAR GASIFIER

CLAIM OF PRIORITY

This application claims the benefit of priority under 35 U.S.C §119(e) of Hathaway, U.S. Provisional Patent Application Ser. No. 61/595,779, entitled "SOLAR GASIFIER", filed on Feb. 7, 2012, which is herein incorporated by reference in its entirety.

BACKGROUND

The world demand for energy is projected to increase by 40% over the course of the next 20 years and double by 2050. Liquid fuels derived from petroleum account for the largest share of global energy consumption, the majority consumed for transportation. One of the potential options for sustainable, low carbon fuels to replace fossil fuels is biofuel. Biofuels such as corn ethanol and soybean biodiesel have been criticized for their low life cycle energy efficiency as well as for competing with food production for critical agricultural land. Low-input biomass, such as mixed perennials, agricultural byproducts, or conservation reserve program (CRP) cuttings, offers the potential to produce life cycle carbon-neutral to carbon-negative fuels. Methods for utilizing these low-input feedstocks can include biochemical (e.g., fermentation, anaerobic digestion) or thermochemical (e.g., gasification, pyrolysis) processes. Compared to biochemical processes, thermochemical methods are typically amenable to a wider variety of feedstock and operate with higher rates of conversion. However, obtaining the thermal energy at sufficiently high temperatures and rates to drive the process efficiently requires combustion of the feedstock or reliance on carbon intensive fossil energy sources.

SUMMARY

In various embodiments, the present invention provides a solar gasifier. The solar gasifier includes a reaction chamber configured to hold a catalyst and a reactant. A reactant inlet port and a product outlet port are fluidly connected to the reaction chamber. A heating chamber is configured to receive light, wherein the heating chamber is positioned underneath at least a portion the reaction chamber.

In various embodiments, the present invention provides a solar gasifier including a heating chamber configured to receive light, including a longitudinal axis disposed horizontally when the gasifier is in use. A reaction chamber at least partially encompasses the heating chamber. The reaction chamber can be configured to hold a molten salt. The reaction chamber is configured to permit vertical movement of a product within the reaction chamber. A reactant inlet port is in fluid communication with a bottom portion of the reaction chamber and a product outlet in fluid communication with a top portion of the reaction chamber.

In various embodiments, the present invention provides a solar gasification system. The system includes a feed stock supply conduit. A solar concentration apparatus and a solar gasifier. The solar gasifier includes a heating chamber, including a longitudinal axis disposed horizontally when the gasifier is in use, configured to receive light from the solar concentration apparatus. A reaction chamber, including a molten salt, at least partially encompasses the heating chamber. The reaction chamber is configured to permit vertical movement of a product within the reaction chamber. A feedstock inlet port is in fluid communication with a bottom portion of the reaction chamber configured to receive the feedstock supply conduit. A product outlet is in fluid communication with a top portion of the reaction chamber and a product outlet conduit is in fluid communication with the product outlet.

Various embodiments of the present invention have certain advantages over other solar gasifiers and systems, at least some of which are unexpected. The present invention can provide greater efficiency through enhanced heat transfer. For example, previous solar gasifiers experienced non-uniform temperature distributions in packed beds due to poor heat transfer. Various embodiments of the present invention provide a material, such as a catalyst, with increased heat capacity to provide more uniform temperature distributions. Further, various examples of the present invention provide a solar gasifier with an annular geometry that utilizes heat flow within the reaction chamber to more efficiently produce syngas. For example, the present invention can provide increased reactant conversion to syngas or more efficient use of concentrated solar energy as compared to previous approaches.

Various embodiments of the present invention can provide reduced formation of tar or ash, as compared to previous approaches. Secondary products from gasification of biomass pose several issues. The buildup of residual ash can increase radiative losses as well as insulate the reaction zone. Tars produced as a byproduct of uncatalyzed gasification can condense on optical surfaces. Packed beds are especially prone to tar production during startup. Platinum automotive catalyst particles have been used in an attempt to crack and gasify these tars with moderate success.

Various embodiments of the present invention provide the benefit of at least partially reducing partial combustion of the reactant. In one example, partial combustion can be eliminated. For example, the reactant, biomass, or feedstock can be converted within the solar gasifier to useful syngas without partially combusting the reactant as an external heat source. In various embodiments, the present solar gasifier produces syngas that is not diluted by excess $CO_2$, $N_2$, or other combustion reaction by-products, as compared to previous approaches. For example, the annular geometry, catalyst, gasifying agent, or combination thereof can mitigate or substantially reduce byproduct production.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Gasification

Gasification of biomass can encompass pyrolysis. Gasification can further encompass carbon or char gasification. The product of gasification can include synthesis gas (e.g., syngas), such as a blend of $H_2$ and CO that can be combusted directly, or used as a precursor to generate liquid fuels, synthetic natural gas, or other hydrocarbons. Pyrolysis can include a rapid thermal dissociation reaction in which complex organic molecules, such as the biopolymers cellulose, hemicellulose or lignin, are decomposed at temperatures from about 550 to about 1300 K. With sufficiently fast heating rates, on the order of several hundred degrees per second, flash pyrolysis can yield gaseous products or a solid carbon char of about 5% to about 7% of the feed material by mass. Considering cellulose as a feedstock, an ideal flash pyrolysis reaction at about 1200 K is:

$$C_6H_{10}O_{5,(s)} \rightarrow 5 \cdot (CO_{(g)} + H_{2,(g)}) + C_{(s)} \quad (1)$$

$$\Delta h_p = 128 \frac{kJ}{mol}$$

Carbon or char gasification has a slower reaction rate than pyrolysis and can require the introduction of a gasifying agent such as steam or carbon dioxide. The gasifying agent can be reduced in the presence of carbon at high temperatures resulting in carbon monoxide or, when steam is used, hydrogen. The net gasification reaction of steam with carbon at about 1200 K is:

$$C_{(s)} + H_2O_{(g)} \rightarrow CO_{(g)} + H_{2,(g)} \quad (2)$$

$$\Delta h_g = 144 \frac{kJ}{mol}$$

The conventional approach to biomass gasification involves carrying out reactions (1) and (2) under autothermal conditions, with the use of oxygen in a reaction with biomass. Supplying sufficient energy to achieve autothermal operation can consume or burn about 20% to about 30% of the feedstock to generate the necessary heat input. Partial combustion can limit the energetic yield or require a dedicated oxygen facility to avoid dilution of the product gas.

Various biomass gasification processes can utilize allothermal conditions, such as where heat is supplied by burning a portion of the feedstock or product gas in an external reactor. This approach can at least partially avoid dilution of the product stream but does not reduce the losses in energetic yield of the feedstock.

Solar Gasifier

Figure 1:
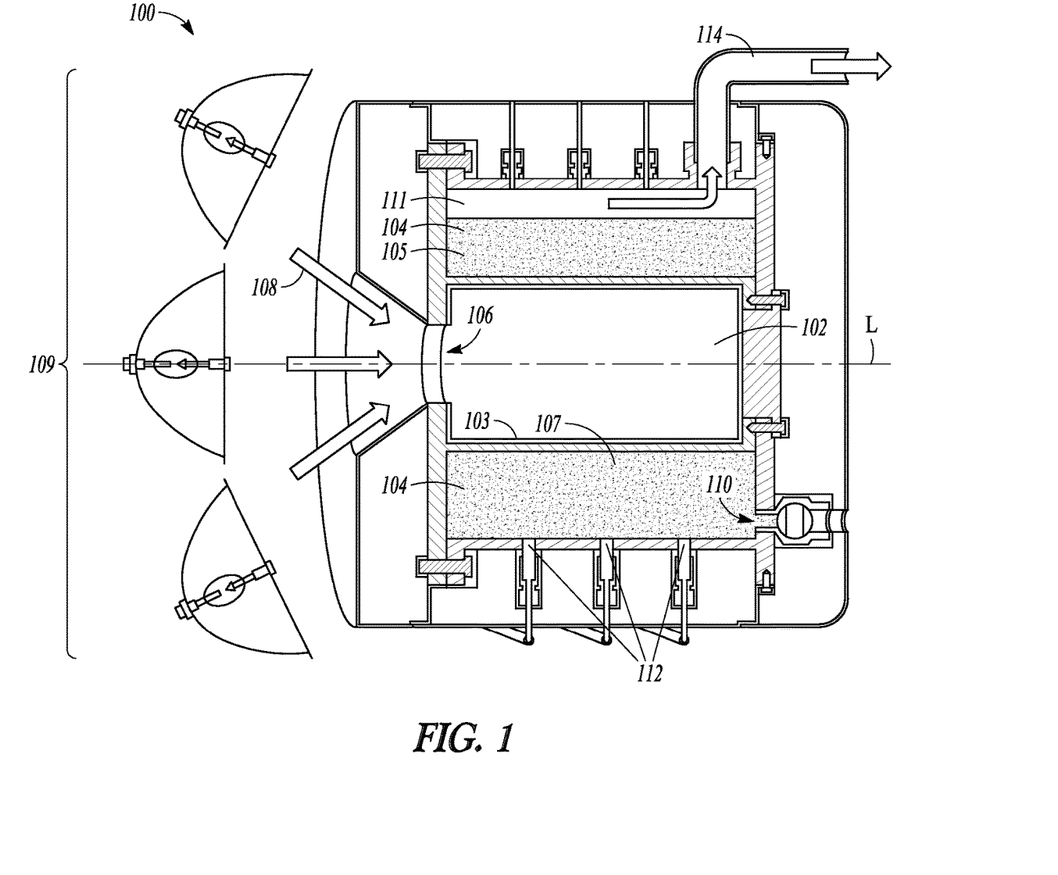
FIG. 1 shows a sectional view of a solar gasifier, according to an embodiment.

FIG. 1 shows a sectional view of a solar gasifier 100, according to the present invention. The solar gasifier, or solar gasification reactor, 100 can include a heating chamber 102. The solar gasifier can further include a reaction chamber 104 configured to hold a catalyst 105. The reaction chamber 104 can include walls with an insulating material, such that heat or thermal energy can be retained within or restricted from leaving the reaction chamber 104. Insulating materials can include any material with insulating properties, such as a fibrous material, a gas, a coated metal, ceramics, or a combination thereof. The insulating material can have a lower thermal conductivity rating compared to material including in the walls of the heating chamber. For example, a wall of the reaction chamber 104 that is not in contact with a wall of the heating chamber 102 can include the insulating material. Further, an outer wall 107 of the reaction chamber 104 that is in contact with an outer wall 103 of the heating chamber 102 can include a thermally conductive material, as described herein. In an example, the reaction chamber 104, heating chamber 102, or solar gasifier 100 can be any geometry, including a cylinder, a sphere, a cube, a cuboid, or a cone. As illustrated in FIG. 1, the solar gasifier 100 is of a cylindrical or tubular geometry, as defined by the walls of at least one of the solar gasifier 100, heating chamber 102, and reaction chamber 104.

In an example, the heating chamber 102 can be at least in contact with the reaction chamber 104. For example, an outer wall 103 of the heating chamber 102 can be in contact with an outer wall 107 of the reaction chamber 104. In an example, the heating chamber 102 is proximate the reaction chamber 104, such that the outer walls 103, 107 of each chamber are not touching, but heat can pass from the heating chamber 102 to the reaction chamber 104. The reaction chamber 104 can define a cavity, such that the heating chamber 102 can be at least partially encompassed within the reaction chamber 104. In an example, at least a portion of the heating chamber 102 is positioned underneath at least a portion of the reaction chamber 104. The heating chamber 102 can be any geometry configuration, including a geometry configured to at least partially fit within the cavity defined by the reaction chamber 104. In an example, at least the portion of the heating chamber 102 positioned underneath the portion of reaction chamber 104 can include any material capable of thermal conduction, such as a metal, crystalline lattice structures, thermal conducting gases or liquids, or a combination thereof. For example, a wall 103 of the heating chamber 102 that is in contact with a wall 107 of the reaction chamber 104 can include the thermally conductive material.

As illustrated in FIG. 1, the heating chamber 102 is encompassed by the reaction chamber 104. In various embodiments, the heating chamber can be configured to permit energy transfer, such as light or solar energy 108, from the heating chamber 102 to the reaction chamber 104, such as by radiation, convection, or conduction, into at least some of the reactant held by the reaction chamber 104. The gasifier 100 can be a dual cavity configuration with an annular or any other suitable geometry. For example, the reaction chamber 104 can be an annular geometry such that it resembles a cylinder or tube with a cylindrical cavity at least partially within the reaction chamber. One cylinder, such as the heating chamber 102, can be heated with the energy 108, such as from the sun or a solar array 109. The outer cylinder, such as the reaction chamber 104, can contain catalyst 105, which can catalyze the gasification reaction in the reactant, biomass, or other material admitted to the reaction chamber 104.

The heating chamber 102 and reaction chamber 104 can be oriented with their longitudinal axes L horizontal or vertical, however, orientations are not so limited. Although FIG. 1 illustrates a common longitudinal axis L between the heating chamber 102 and the reaction chamber 104, embodiments are not so limited. The longitudinal axis L can define a top portion of the reaction chamber above the axis L and a bottom portion of the reaction chamber below the axis L. For example, the solar gasifier 100 can be symmetrical or asymmetrical for a number of reasons, including, but not limited to, increasing heat flow, increasing reactant flow, increasing steam flow, fitting a pre-existing footprint at a facility, or a combination thereof. For instance, for a configuration having increased heat flow, an example of the present subject matter can be configured to have an increased contact surface area between the heating chamber 102 and reaction chamber 104, as compared with other examples. Other orientations are possible, but it will be seen that the heating chamber 102 is generally arranged at least partially within the reaction chamber 104 so that at least a portion of the heating chamber 102 can be positioned underneath at least a portion of the reactant held by the reaction chamber 104. Such an arrangement can permit heat in the heating chamber 102 to pass upwardly into at least some of the reactant held by the reaction chamber 104, as described herein.

In an example, the reaction chamber 104 can be configured to hold the catalyst 105 in a packed bed, a loose bed, a matrix, a lattice configuration, or a combination thereof. The catalyst 105 can include a salt, such as a molten alkali salt, a molten carbonate salt, or a combination thereof. An alkali can include any basic, ionic salt of an alkali metal or alkaline earth metal, such as lithium, sodium, potassium, rubidium, cesium, francium, beryllium, magnesium, calcium, strontium, barium, or radium. Further, carbonate salt of the alkali or alkaline earth metal can include lithium carbonate salt, sodium carbonate salt, potassium carbonate salt, rubidium carbonate salt, cesium carbonate salt, francium carbonate salt, beryllium carbonate salt, magnesium carbonate salt, calcium carbonate salt, strontium carbonate salt, barium carbonate salt, or radium carbonate salt. In an example, carbonate salts can be preferred to chlorides or fluorides to avoid production of chlorine or fluorine gas.

In an example, a ternary eutectic blend containing lithium carbonate, potassium carbonate, and sodium carbonate can be used as the catalyst 105. The ternary eutectic blend can include any percentages of each carbonate salt. For example, the eutectic blend can include about 0.1% wt to about 99.99% wt lithium carbonate, about 0.1% wt to about 99.99% wt potassium carbonate, about 0.1% wt to about 99.99% wt sodium carbonate, such that the three carbonate salts add up to 100% wt of the eutectic blend. The ternary eutectic blend containing lithium carbonate can have a reduced melting point as compared to a blend no containing lithium carbonate. For example, the ternary eutectic blend can have a melting point of about 600 K to about 800 K, whereas a blend without lithium carbonate can have a melting point of about 970 K. Further, the presence of lithium carbonate in the eutectic blend can reduce corrosion of stainless steel surfaces greater than blends without lithium carbonate. In some examples, the presence of lithium carbonate can enhance gasification performance beyond that observed for any single or binary carbonate salt blend without lithium carbonate. The pertinent properties of an exemplary molten salt blend used below are listed in Table 1.

TABLE 1

Composition and Properties of Ternary Eutectic Alkali Carbonate Salt Blend at 1200K

| Composition [wt %] | 32% $Li_2CO_3$ |
| --- | --- |
|  | 33% $Na_2CO_3$ |
|  | 35% $K_2CO_3$ |
| Thermal Conductivity | 0.72 [W/m-K] |
| Specific Heat | 1842 [J/kg-K] |
| Melting Point | 670 [K] |
| Density | 1680 [kg/m$^3$] |

The heating chamber 102 can include an aperture, a cavity or a surface 106, such as a window or transparent material, configured to permit passage of direct or indirect light or energy 108, such as from the sun, into the heating chamber 102. However, surface 106 is not required, as energy, heat, or light can pass indirectly into the heating chamber 102. In an example, the energy 108 can come from a solar array 109, configured to concentrate solar energy and redirect it toward the heating chamber 102 or surface 106. For example, energy 108 can come from a solar concentrating facility, such as the solar array 109, that uses mirrors. The energy directed toward the surface 106 from the solar array 109 can be the drive heat input for the gasifier 100. In some embodiments, the energy or light can be directed to an outer surface of the heating chamber 102, such as a surface proximate the reaction chamber 104.

The reaction chamber 104 can include at least one reactant inlet port 110 configured to permit passage of a reactant, such as biomass, into the reaction chamber 104. Biomass can include any carbonaceous or biological material from deceased or living organisms, such as plants or plant-derived material. The reactant can be introduced into a bottom of the gasifier 100, such as below the horizontal longitudinal axis L illustrated in FIG. 1, through a reactant inlet port 110. Product, such as syngas, can exit from a top of the gasifier 100 through product outlet port 114. Heat generated by the heating chamber 102 can pass into at least some of the catalyst 105 held by the reaction chamber 104. For example, heat can pass to the reaction chamber 104 from above, below, or near the heating chamber 102. The passage of heat can be aided by, for example, the geometry of the gasifier 100. Convection currents can be developed by the heat passage, such that the reaction chamber 104 can be heated and, consequently, the catalyst 105 can either react in the bottom of the reaction chamber 104 or move from the bottom of the reaction chamber 104 to the top of the reaction chamber 104, such that products of the gasification reaction, such as syngas, can exit from the top of the gasifier 100 through product outlet port 114. For example, the reactant can move upward in the reaction chamber 104 due to density changes resulting from heating of the reactant or chemical changes in the reactant. Further, the product can move upward in the reaction chamber 104 due to the lower product density as compared to the reactant or catalyst 105. In an example, the reaction chamber 104 can include a space 111 at a top portion of the reaction chamber for the product to collect before exiting through the product outlet port 114. The space 111 at the top portion of the reaction chamber 104 can be formed by not filling the entire volume of the reaction chamber 104 with molten salt and reactant.

Further, the reaction chamber 104 can include at least one steam or catalyst inlet port 112 fluidly connected to the reaction chamber 104. Steam or catalyst inlet port 112 can be used to communicate at least one of a gasifying agent, steam, feedstock, and frozen salt to the reaction chamber 104. For example, a gasifying agent can provide oxygen used to be converted gaseous carbon monoxide for the carbon or char gasification of solid carbon. The gasifying agent can provide oxygen in any form, including water or carbon dioxide.

In various embodiments, the reaction chamber 104 can include, but does not require, active stirring to maintain a continuous reaction. The reaction occurring within the reaction chamber 104 can be held separate from an external environment. For example, the reaction chamber 104 can provide an oxygen depleted environment. The solar gasifier 100 can permit a continuous conversion process, such that gasification can run in the absence of natural sunlight, at least due to the high heat capacity of the system, solar gasifier, catalyst, molten salt, or a combination thereof.

Experimental Method

The present invention can be understood by reference to the following Examples which are offered by way of illustration. For ease of reading, a list of common, repeated, or well defined variable nomenclature is provided at the end of this section. The present invention is not limited to the Examples given herein.

To independently examine pyrolysis and gasification, two feedstocks can be studied. For pyrolysis, the feedstock is microcrystalline cellulose powder, such as ARCOS Organics, 50 µm particle size. The cellulose powder was compressed into 8 mm and 10 mm diameter tablets with corresponding thicknesses of 3.2 mm and 4.7 mm. The cellulose powder was mixed with distilled water to obtain 20% wt moisture to aid stability while forming the tablets. The tablets were dried in a vacuum oven at 390 K and 0.2 atm to 7 to 10% wt moisture. Based on a cellulose density of 1.2 to 1.4 g/cm$^3$, the estimated porosity of the tablets is 20 to 45%.

For gasification reactions, the feedstock is activated wood charcoal powder, such Fluka Analytical, less than 40 µm particle size and about 700 m$^2$/g specific surface, with a 40% wt paraffin wax binder, such as McMaster-Carr 1085K991. The powder was formed into 8 mm diameter by 3.4 mm thick tablets. The tablets are 91% carbon by mass with an initial porosity of 37% based on a density of 2.2 g/cm3 for charcoal and 0.9 g/cm3 for paraffin wax, $C_{30}H_{62}$. A eutectic blend of molten salt, as listed in Table 1, is used for the experiments.

Figure 2A:
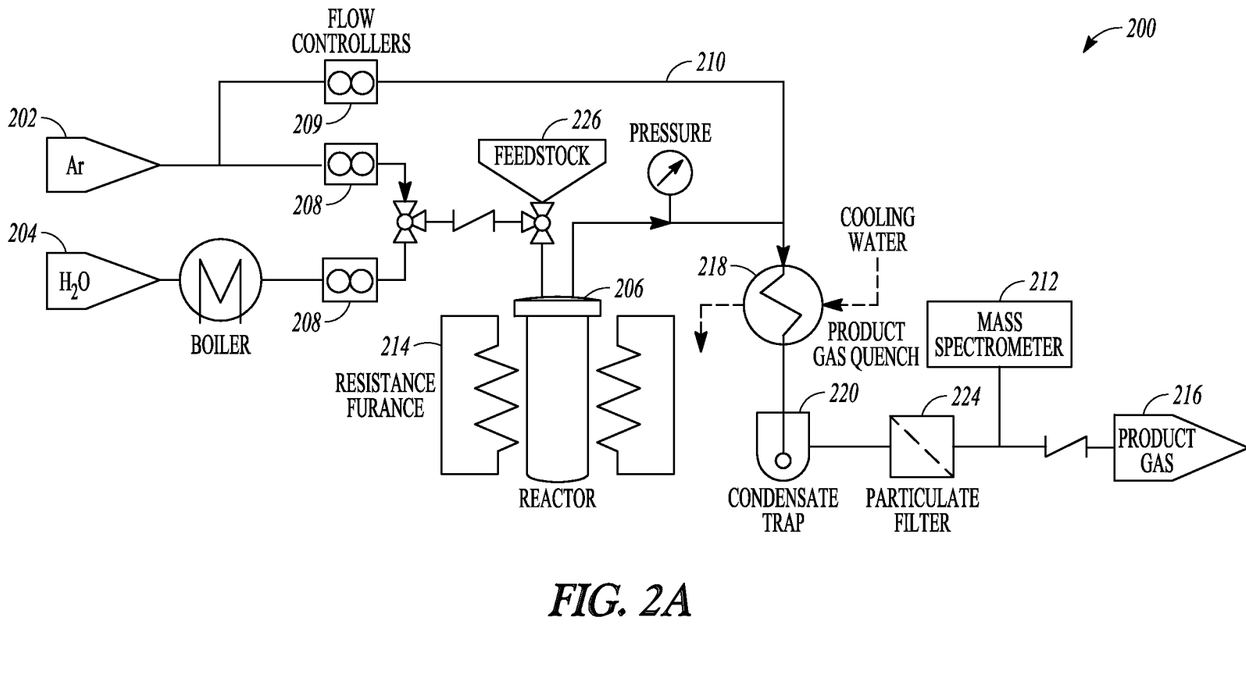
FIG. 2A shows a flow diagram of a system used to carry out the gasification and pyrolysis reactions, according to an embodiment.

A schematic of the facility 200 used to obtain kinetic data is shown in FIG. 2A. Argon 202 and steam 204 are supplied to the reactor 206 via mass flow controllers 208 capable of 0-100 std mL/min or 0-500 std mL/min. A bypass stream of argon 210, controlled by a separate 0-8000 std mL/min flow controller 209, dilutes the outlet products prior to analysis via mass spectroscopy 212. Prior to mass spectroscopy the diluted product stream can be quenched 218, collected in a condensate trap 220, and filtered 224. This bypass stream is designed to prevent secondary reactions in the product gas 216, speed transit time to the mass spectrometer 212, and provide a reference flow from which the product gas 216 yield rates were calculated.

Figure 2B:
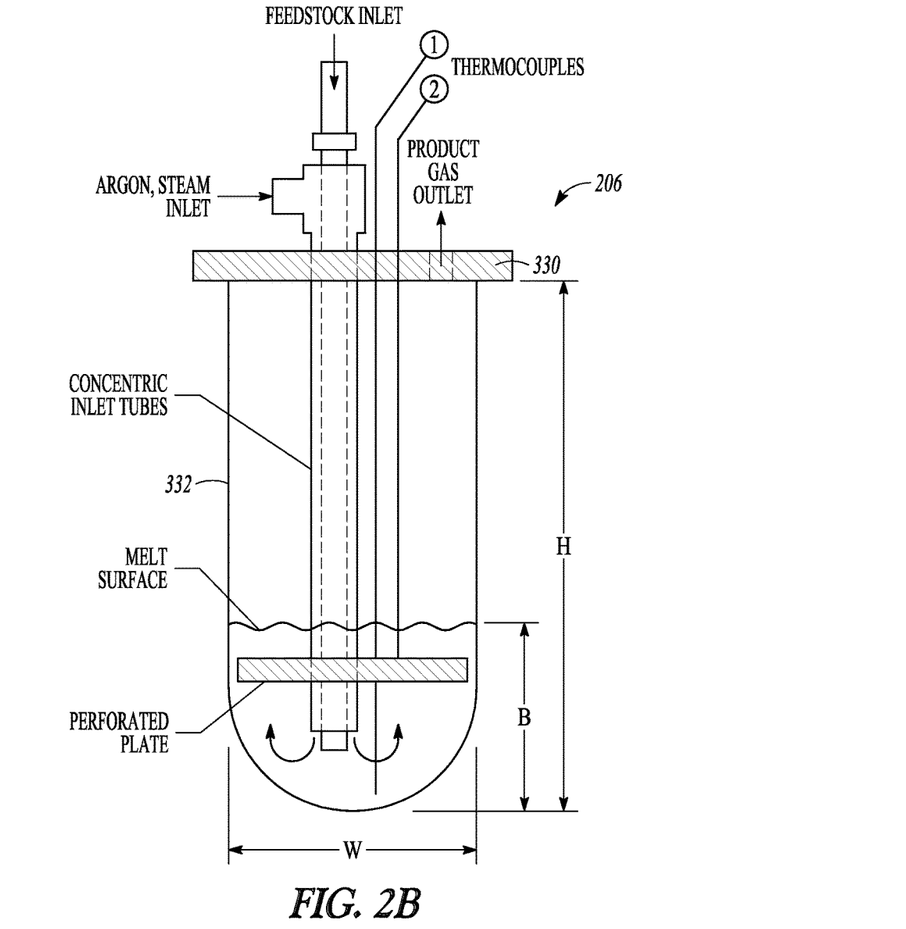
FIG. 2B shows a view of a reactor assembly, according to an embodiment.

The reactor 206 is further illustrated in FIG. 2B, is an H height by W diameter cylindrical alumina crucible which is positioned vertically within a stainless steel enclosure 332 and sealed with a flange 330 containing connections for feedstock delivery (e.g., 226, FIG. 2A), gas extraction, and temperature sensors. In an example, the reactor 206 is 64 mm diameter by 178 mm long. Heating was provided by a 2.5 kW crucible furnace (e.g., 214, FIG. 2A) capable of temperatures up to 1573 K. The furnace power level was controlled to achieve the desired set point based on the temperature indicated by two type-K thermocouples, with ±9 K accuracy, located just beneath the salt level.

The feedstock tablets were fed through the inner of two concentric tubes which make up the feedstock/reactant delivery assembly by a manual plunger. Steam and argon were fed through the annulus of the same assembly. The outlets of both tubes are located about mid-depth of the salt melt of depth B, approximately 30 mm from the surface, and about 20 mm beneath a perforated stainless steel plate that ensures the feedstock is submerged during reactions with salt present. Product gases leaving the reactor 206 were passed first through a condenser at 270 K, followed by a condensate trap and a HEPA filter. A portion of the product gas stream was sampled by an Inficion Transpector CPM mass spectrometer/residual gas analyzer to detect CO, $H_2$, $CO_2$, $CH_4$, $C_2H_2$, and $C_2H_4$, as well as Ar and $H_2O$.

During experimental runs, the reactor 206 was supplied with a 200 std mL/min reactant flow containing a molar steam concentration of 60% in argon. The reactor pressure was maintained at about 105 kPa while the temperature varied from about 1124 to about 1235 K. The product gas stream was diluted with argon at 1800 std mL/min prior to analysis via mass spectrometry. Initial tests determined these flow conditions are sufficient to achieve zeroth order, with respect to steam, reaction behavior and avoid mass transfer limitations. These conditions result in a molar steam to carbon ratio of 6.6 to 1 at the peak of the gasification reaction rate. Prior to each run with salt present, the alumina crucible was loaded with 280 g of the salt. Air was purged from the system by pulling a −5 psig vacuum followed by increasing pressure 20 psig with argon for five cycles.

For each run, the reactor 206 was heated with only the inert gas flow until the temperature at the bottom of the reactor 206 reached the desired set point. The steam flow was then initiated. Once the mass spectrometer signals for the gases of interest were stable, the signals from the mass spectrometer as well as the gas flow rates, pressure, and temperature were recorded every 1.6 seconds. Feed was delivered as batches of roughly 1 gram of material in the form of 7 of the 8 mm diameter tablets or 3 of the 10 mm diameter tablets. Each run progressed until concentrations of hydrogen and carbon monoxide were within 5% of the levels prior to introduction of feedstock, about 7-30 minutes for pyrolysis or about 20-300 minutes for gasification reactions. Data were acquired for each tablet size and feedstock for temperatures of 1124, 1149, 1176, 1205, and 1235 K. Duplicate data were obtained to ensure repeatability.

In the runs with salt, the melt releases carbon dioxide due to thermal dissociation and interaction with steam, forming alkali metal oxides and hydroxide salts. To ensure a consistent salt composition, after each run the salt melt was exposed to a 200 std mL/min flow of 60% carbon dioxide in argon to reform the carbonate salt.

The primary data collected from each run are transient reactor temperatures, inert and reactant gas flow rates, mass of feedstock supplied, and mass spectrometer signal intensities for the product gas species. The data were analyzed to obtain product gas flow rates in terms of volume at standard conditions (e.g., 273 K, 1 atm), as well as the extent of carbon conversion. The calculations utilize the internal standardization method for gas flow rate determination. Since this method is a constant of proportionality, the response factor is established during calibration by dividing the flow ratio of two gas species by the corresponding mass spectrometer signal ratio. To obtain volumetric gas flows by this method, the calculation proceeds according to:

$$\dot{V} = \frac{I_i}{I_{Ar}} \cdot RF_i \cdot \dot{V}_{Ar} \quad (3)$$

The total mass-normalized gas yield rate reported for the pyrolysis runs is the sum of the flow rates of $H_2$, CO, $CO_2$, and $CH_4$ divided by the mass of feedstock delivered. Higher hydrocarbon production was found to be below the threshold of statistical significance.

The extent of carbon conversion is determined by integrating the moles of carbon present in the product gas from the start of the reaction to time 't' according to:

$$X_C(t) = \frac{\int_0^t (\dot{V}_{CO} + \dot{V}_{CO_2} + \dot{V}_{CH_4})}{m_C^0 / M_C} \cdot \left(\frac{P_{std}}{R \cdot T_{std}}\right) \quad (4)$$

To correct for carbon dioxide released from the carbonate melt, the yield rate of carbon dioxide during the stabilization period prior to feed delivery is modeled according to an exponentially decaying function. The mass balance of carbon based on observed residues on the downstream portion of the reactor system and the corrected carbon conversion was closed to within about +2% to about −5%.

Data Analysis

Two methods of analysis can be used to obtain kinetic models for the pyrolysis and steam gasification reactions. The first method includes kinetic models for the reactions with salt. The second method includes kinetic models for the reactions without salt. Both reactions were run with and without molten salt. For the gasification analysis, kinetically controlled conditions were obtained, allowing for direct extraction of kinetic parameters from the data. For pyrolysis, heat transfer limits the rate of reaction. Thus, a numerical model of the combined pyrolysis and gasification of cellulose was formulated and the pyrolysis reaction parameters were obtained from a best fit of the rate data.

A simple means of describing the rate of either of these processes is the reactivity index. The intent of the reactivity index is to quickly gauge the change in reaction rates for a given reaction with and without salt. This index is defined as the inverse of twice the time needed to reach 50% conversion and gives an estimate of the overall rate for complete conversion of the reactant material:

$$\tau = (2 \cdot t_{50\%})^{-1} \quad (5)$$

Steam Gasification

The kinetics of steam gasification reactions are often represented using a single step model given by:

$$\frac{dX_C}{dt} = k_i \cdot (1 - X_C)^n \quad (6)$$

where $X_C$ is the extent of carbon conversion defined by equation (4), n is the order of the reaction with respect to carbon, and k is the rate constant. The rate constant is assumed to follow an Arrhenius expression:

$$k_i = k_{0,i} \cdot \exp\left(\frac{-E_g}{R \cdot T}\right) \quad (7)$$

Two commonly used variants of this model are the volumetric model (VM) and grain model (GM). The volumetric model assumes the reaction takes place homogeneously within the particle, the reaction surface area decreases linearly with conversion, and the order of the reaction is given by n=1. On the other hand, the grain model assumes the reaction takes place at the surface of a collection of shrinking spherical grains, resulting in reaction of order n=2/3. For gasification, the grain model is applied because it includes surface area growth and has been shown to result in a better fit to data in prior studies of various chars.

The product of the rate constant and elapsed time as a function of the extent of carbon conversion, $X_C$, for the grain model is:

$$3 \cdot (1-(1-X_C)^{1/3}) = k_{GM} \cdot t \quad (8)$$

By plotting the carbon conversion function shown on the left hand side of equation (8) with respect to time, the slope of a linear regression of the data yields the rate constant at each temperature. After obtaining the kinetic rate parameters from the data over the temperature range of interest, an Arrhenius model for the temperature dependence of the kinetic rate is determined according to the expression of equation (7) above.

Cellulose Pyrolysis

Figure 3:
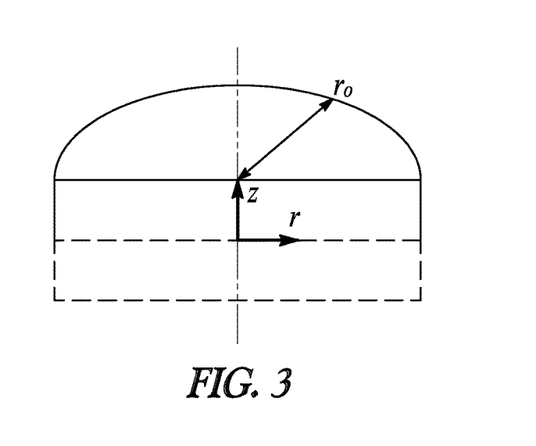
FIG. 3 shows a computation domain representing the cross section through the mid-plane of a feed tablet.

To extract kinetic parameters from the pyrolysis data, a two-dimensional numerical model of the reacting tablets was developed. The finite-volume model includes the chemical reaction terms governing pyrolysis rates, gasification rates, and energy consumption, release of product gas, and transport of heat and gases through the tablet. The computational domain is shown in FIG. 3. This volume represents one half of a tablet, with the mid-plane located at the origin of the z-axis.

The pyrolysis reaction is modeled as a single-step first-order reaction with respect to cellulose mass, based on the volumetric model of equation (7) where n=1.

$$\dot{R}_p = k_p \cdot \frac{m_{cell}}{V} \quad (9)$$

Without salt, the activation energy, $E_p$, is set at 238 kJ/mol, which is the value found to apply to the pyrolysis of a wide variety of cellulosic materials. The pre-exponential factor is established by minimizing the error associated with a regression of the data from control runs carried out without molten salt. In the case where molten salt is present, the activation energy is determined from a regression analysis of the data while the pre-exponential factor is maintained at the value previously established by regression of the salt-free data.

This procedure is sometimes employed for determining cellulose pyrolysis kinetics to avoid complications related to the compensation effect. The compensation effect describes the observed behavior of pyrolysis kinetic parameters, whereby reported values of the pre-exponential factor and the activation energy for uncatalyzed pyrolysis occupy a wide range of values that form a linear relationship. As a result, changes in the operating conditions can result in a change of obtained kinetic parameters even though catalytic behavior cannot be present. By fixing the pre-exponential factor based on uncatalyzed (e.g., no salt) data, any catalytic behavior will be evidenced by a decrease in the activation energy.

The gasification reaction is modeled similarly using the chemical kinetic model and parameters determined for carbon gasification. The volumetric reaction rate is related to the rate of change of carbon conversion by:

$$\dot{R}_g = \frac{dX_C}{dt} \cdot \frac{m_{C,max}}{V} \tag{10}$$

Substituting the differential equation for the rate of change of the extent of carbon conversion from equation (6) into this equation yields:

$$\dot{R}_g = k_{GM} \cdot (1 - X_C)^{2/3} \cdot \frac{m_{C,max}}{V} \tag{11}$$

The extent of conversion, $X_C$, can be defined in terms of the initial (e.g., maximum) mass of carbon delivered to the system and the current mass of carbon present according to:

$$X_C = 1 - \frac{m_C}{m_{C,max}} \tag{12}$$

Replacing the extent of conversion in the volumetric rate equation then leads to the final form of the volumetric reaction rate:

$$\dot{R}_g = k_{GM} \cdot \left(\frac{m_C}{m_{C,max}}\right)^{2/3} \cdot \frac{m_{C,max}}{V} = k_{GM} \cdot \frac{m_C^{2/3}}{V} \cdot m_{C,max}^{1/3} \tag{13}$$

The differential energy equation for an axisymmetric, isotropic porous cylindrical solid undergoing a chemical reaction and considering convection due to product gases is given by:

$$(\phi \cdot C_g + (1-\phi) \cdot C_s) \cdot \frac{\partial T}{\partial t} + \phi \cdot C_g \cdot \left(u_r \frac{\partial T}{\partial r} + u_z \frac{\partial T}{\partial z}\right) = \left(\frac{1}{r}\frac{\partial}{\partial r}\left(r \cdot k_{eff} \frac{\partial T}{\partial r}\right) + k_{eff} \frac{\partial^2 T}{\partial z^2}\right) - \dot{R}_p \Delta H_{R,p} - \dot{R}_g \Delta H_{R,g} \tag{14}$$

The volumetric heat capacities are separated into gas and solid components which are combined according to the porosity of the region of interest to establish an effective volumetric heat capacity. The effective thermal conductivity is calculated according to the method of Yagi and Kunii for combined conduction and radiation within high temperature porous structures, as described in Yagi, S., and Kunii, D., 1957, "*Studies on Effective Thermal Conductivities in Packed Beds*," Chem. Eng. Prog., 3(3), pp. 373-381. The heat capacity and thermal conductivity of the product gas were established considering a well-mixed blend of average product gas components over an applicable range of temperatures.

The flow of the gases through the cellulose tablet is governed by the continuity equation:

$$\frac{\partial \phi}{\partial t} + \frac{1}{r} \cdot \frac{\partial (r \cdot \phi \cdot u_r)}{\partial r} + \frac{\partial (\phi \cdot u_z)}{\partial z} = \frac{\dot{R}_p}{\rho} + \frac{\dot{R}_g}{\rho} \tag{15}$$

The gases are considered incompressible with a density corresponding to standard conditions at 1 atm and 273 K. As the gases are produced from within the reacting volume, local thermal equilibrium is assumed. Because of this assumption, the effect of convective heat transport through the tablet is determined by the mass flux of gas alone and the assumption of constant density does not influence the behavior of the model.

The initial conditions of the simulation are uniform ambient temperature and porosity throughout the tablet:

$$T(r,z,0) = 300K, \phi(r,z,0) = \phi_0 \tag{16}$$

In the radial direction, boundary conditions consist of a symmetry condition at the center-line of the cylindrical axis of the tablet, $$\frac{\partial T}{\partial r}(0, z, t) = 0, u_r(0, z, t) = 0 \tag{17}$$

as well as a convective heat transfer condition at the perimeter of the tablet, $$k_{eff} \cdot \frac{\partial T}{\partial r}(r_o, z, t) = h_{tot} \cdot (T_\infty - T(r_o, z, t)) \tag{18}$$

The heat transfer coefficient, $h_{tot}$, includes the effects of radiative exchange with the gray-diffuse walls of the reactor 206 in the cases without salt.

Without salt, the convective heat transfer term is set to 22 W/m²-K, which corresponds to the tablets behaving like spheres exposed to a bulk gas velocity of 10 cm/s, the calculated velocity at which the feed gases exit the delivery annulus within the reactor 206 at 1200 K conditions, according to the correlation of Whitaker, Whitaker, S., 1972, "*Forced Convection Heat Transfer Correlations for Flow in Pipes, Past Fat Plates, Single Cylinders, Single Spheres, and for Flow in Packed Beds and Tube Bundles*," AIChE J.; 18(2), pp. 361-371.

With salt, the correlation of Whitaker is not acceptable because the Prandtl number of about 0.07 is outside of the applicable range. Further, the flow field is unknown. Thus, the regression was optimized to determine this value starting from an initial estimate of 400 W/m2-K in addition to the activation energy. This estimate corresponds to a Nusselt number of 2 for an 8 mm tablet in a lightly agitated salt melt.

The radiative exchange was assumed to take place between a small convex object within a large cavity. This behavior can be represented as a heat transfer coefficient according to:

$$h_{rad} = \sigma \cdot \epsilon \cdot (T_\infty^2 + T^2(r_o,z,t)) \cdot (T_\infty + T(r_o,z,t)) \tag{19}$$

In the z-direction, similar boundary conditions are imposed, with symmetry conditions along the mid-plane of the tablet, $$\frac{\partial T}{\partial z}(r, 0, t) = 0, u_z(r, 0, t) = 0 \tag{20}$$

and a convective heat transfer condition along the upper boundary of the tablet $$k_{eff} \cdot \frac{\partial T}{\partial z}(r, z_o, t) = h_{tot} \cdot (T_\infty - T(r, z_o, t)) \quad (21)$$

The governing equations, discussed herein, along with initial and boundary conditions were solved using an explicit finite-volume program written in FORTRAN 90 and compiled using the GNU Fortran compiler. The computational domain of FIG. 2 was discretized into twenty radial and ten axial divisions, creating a total of 200 volumes. The model was verified with an analytical solution for transient conduction in a finite cylinder with equivalent thermal diffusivity. The maximum deviation between the analytical and numerical solution was less than 1%.

The continuity equation was solved using an upwind method moving from the coordinate origin outwards while assuming the average velocity leaving both downwind faces of any given volume is uniform.

In the gaseous environment, the tablets sit directly against the bottom of the crucible, so a change in boundary conditions was explored by doubling the thickness of the domain to include the full tablet and setting a fixed temperature condition at the lower surface. Negligible change in the predicted gas yield behavior was observed.

Regression of the simulated and measured mass-normalized volume yield rates was achieved by adjusting the convective heat transfer coefficient as well as either the activation energy or the pre-exponential factor to achieve minimization of a root-mean-square objective error function:

$$f_{fit} = \sqrt{\frac{1}{N} \sum_{i=1}^{N} \left( \frac{\dot{V}_i}{m_o} - \frac{\dot{V}_{model,i}}{m_{model}} \right)^2} \quad (22)$$

The minimization of the error function was achieved with the use of the GenOpt numerical optimization program's implementation of the Hooke-Jeeves global parameter search algorithm. This algorithm searches for a global minimum in the error function while optimizing any number of parameters. As a minima is approached, step size is decreased until the minima is located with a step size of less than about 0.5% of the magnitude of the parameters of interest.

Results

Steam Gasification

Figure 4A:
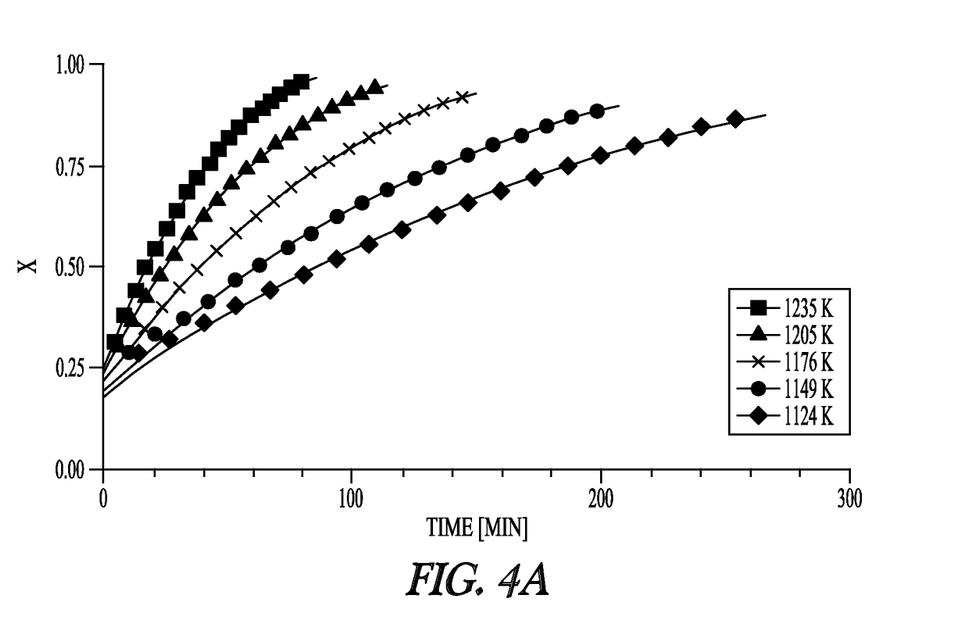
FIG. 4A shows carbon conversion for steam gasification reactions at various temperatures in a gaseous environment.
Figure 4B:
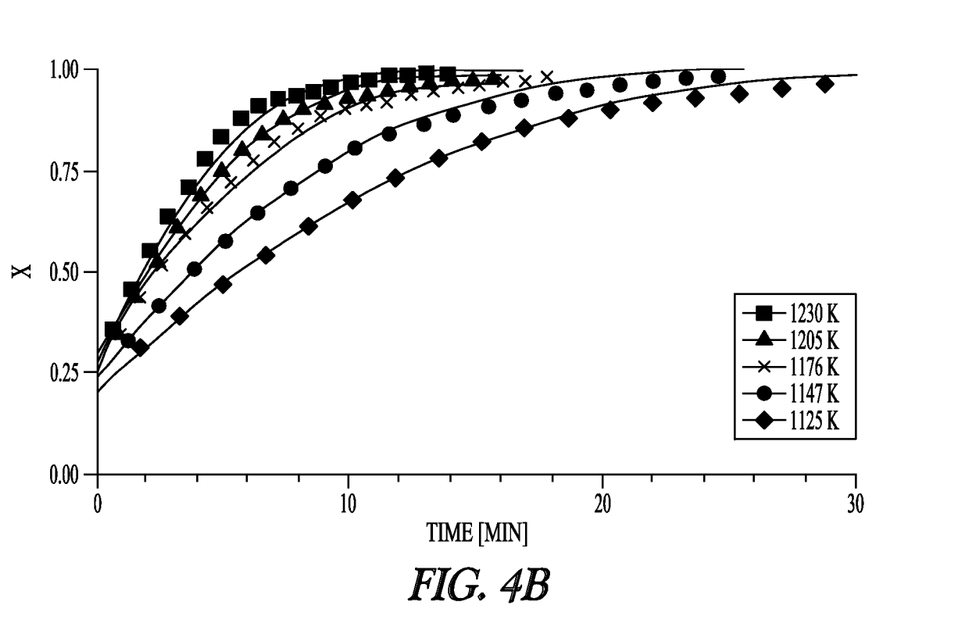
FIG. 4B shows carbon conversion for steam gasification reactions at various temperatures in a molten salt environment.

The measured and predicted carbon conversions for each temperature are shown in FIGS. 4A-B as a function of reaction time. FIG. 4A shows the data without salt and FIG. 4B shows the data with salt. At each temperature, the conversion rises rapidly to about 20% initially due to the release of carbonaceous gases during initial pyrolysis of the wax binder. When adjusted for this initial release, the shrinking grain model fits the data well with and without salt. The average error in the predicted conversion is about ±1.1% without salt and about ±1.9% with salt.

Figure 5:
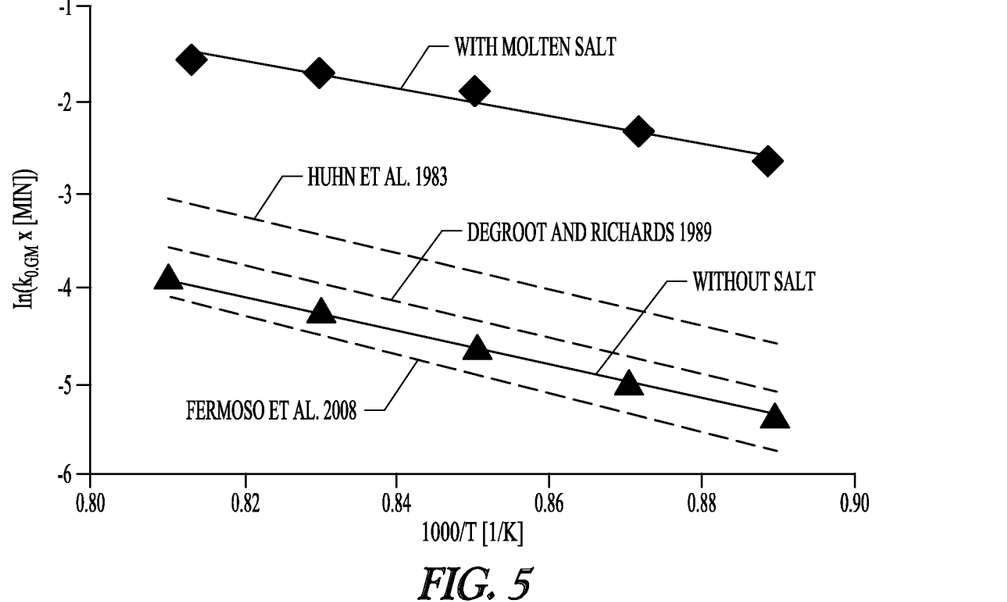
FIG. 5 shows an Arrhenius plot of steam gasification data with and without molten alkali carbonate salt.

The rate constants obtained in the present study are shown on an Arrhenius plot in FIG. 5. For comparison, the figure includes kinetic models from prior studies of steam gasification of a variety of carbonaceous chars without salt. The data from Fermoso, J., Arias, B., Pevida, C., 2008, "Kinetic Models Comparison for Steam Gasification of Different Nature Fuel Chars," Journal of Thermal Analysis and calorimetry, 91(3), pp. 779-786, are for petroleum coke char. DeGroot, W. F., and Richards, G. N., 1989, "Relative Rates of Carbon Gasification in Oxygen, Steam and Carbon Dioxide", Carbon, 27(2), pp. 247 utilized cellulose char, and Huhn, F., Klein, J., and Juntgen, H., 1983, "Investigations on the Alkali-Catalysed Steam Gasification of Coal: Kinetics and Interactions of Alkali Catalyst with Carbon", Fuel, 62(2), pp. 196-199 examined coal. The linear model fits the obtained values for the reaction across all temperatures, implying uniform kinetics in the temperature range of interest. The no-salt data fall within the range of the prior work. The higher reaction rates with salt are evidence of catalysis. Steam mass transfer limitations were avoided by ensuring steady reaction rates despite increases in steam flow as described in the experimental methods section.

Table 2 lists the kinetic parameters that were obtained by linear regression of the data of FIG. 5:

TABLE 2

Kinetic Parameters Obtained for the Steam Gasification of Carbon using the Shrinking-Gain Model

| Conditions | $K_{0,GM}$ [1/min] | $E_g$ [kJ/mol] |
|---|---|---|
| Without Salt | $5.9 \cdot 10^4$ | 152 |
| With Salt | $5.9 \cdot 10^4$ | 158 |

There is a significant impact of the salt on the pre-exponential factor. Without salt, $k_{GM}=5.9 \cdot 104$ 1/min. With salt, the pre-exponential factor increases over an order of magnitude to $1.5 \cdot 106$ 1/min. These results along with the slight increase in activation energy suggest that catalysis of the carbon gasification reaction is due to a change in the reaction pathway as suggested by Wood, B. J., and Sancier, K. M., 1984, "Mechanism of the Catalytic Gasification of Coal Char: A Critical Review," Catalysis Reviews, 26(2), pp. 233. This pathway, predicted for high concentrations of alkali carbonate salt, calls for the formation of metal-oxygen surface complexes along the edges of the aromatic carbon surface, allowing gasification to take place on all exposed carbon surfaces rather than only free carbon sites or breaks in the aromatic ring structure as is the case with uncatalyzed steam gasification. The increase in number of reaction sites, sometimes described as the active sites becoming mobile, is suggested to be the reason for the significant increase in the pre-exponential factor.

The presence of molten salt increases the reactivity of the carbon gasification reaction by more than an order of magnitude from an average reactivity of about 0.9 l/hour to about 11.4 l/hour. Char generated during biomass gasification would be consumed over 10 times faster in a molten salt environment. This finding is a factor when the time needed to achieve steady-state operation of a solar gasification system is considered, as this time period is limited by the slowest reaction involved, and thus depends on the time it takes to consume the char produced by the pyrolysis reaction. With the molten carbonate salt present, a much more responsive system is achieved, obtaining steady state in 20 minutes as compared to 200 minutes.

To obtain kinetically limited reaction rates, an excess of steam was delivered during the gasification runs, resulting in product gas compositions strongly skewed by the water gas shift reaction. These compositions are not pertinent for this model of the gasification reaction. Additionally, tars were not a significant byproduct of the carbon gasification reaction based on the lack of filter or condenser residues.

Cellulose Pyrolysis

Figure 6:
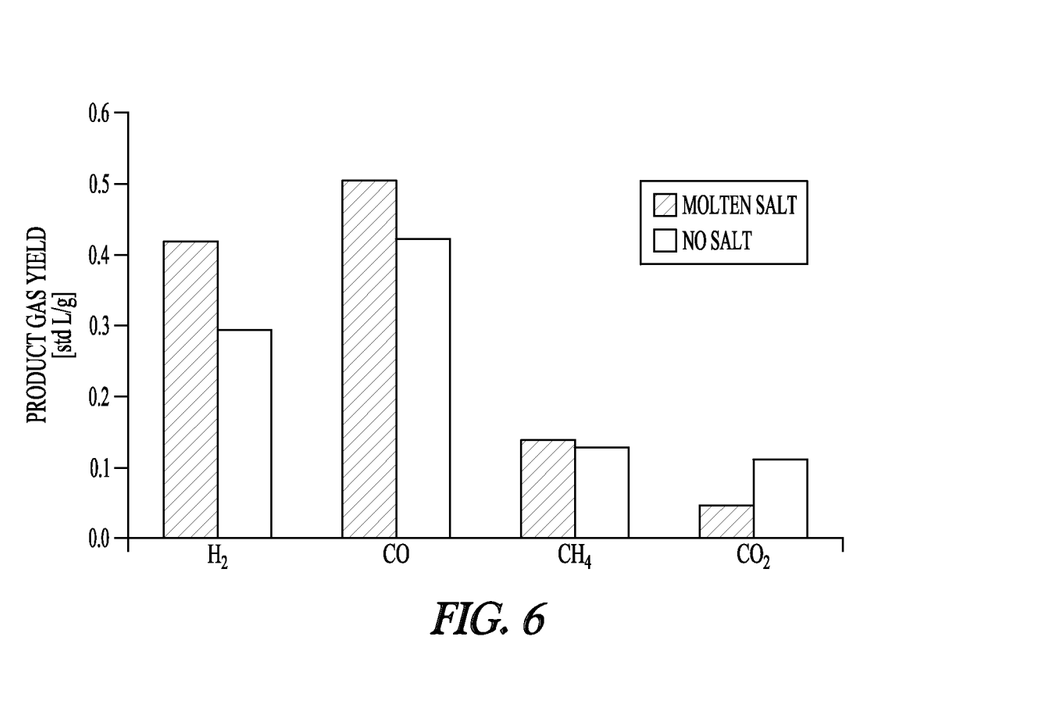
FIG. 6 shows an average measured product gas yield for cellulose tablets undergoing flash pyrolysis.

The average product gas yield per unit cellulose for the pyrolysis reactions at temperatures above 1200 K is given in FIG. 6. In the presence of molten salt, the yield of the primary products, hydrogen, and carbon monoxide increased by 29% while the corrected carbon dioxide yield decreased by 62%. The increased synthesis gas production is attributed to a combination of reduced carbon dioxide production, and cracking of retained tars. Methane production was unaffected by the presence of salt. With molten salt, the presence of tars in the HEPA filter and condenser was reduced from 7 to 12% of the feedstock mass to less than 1% of the feedstock mass. The tar appeared as a sooty black deposit on the condenser walls and filter material.

Figure 7:
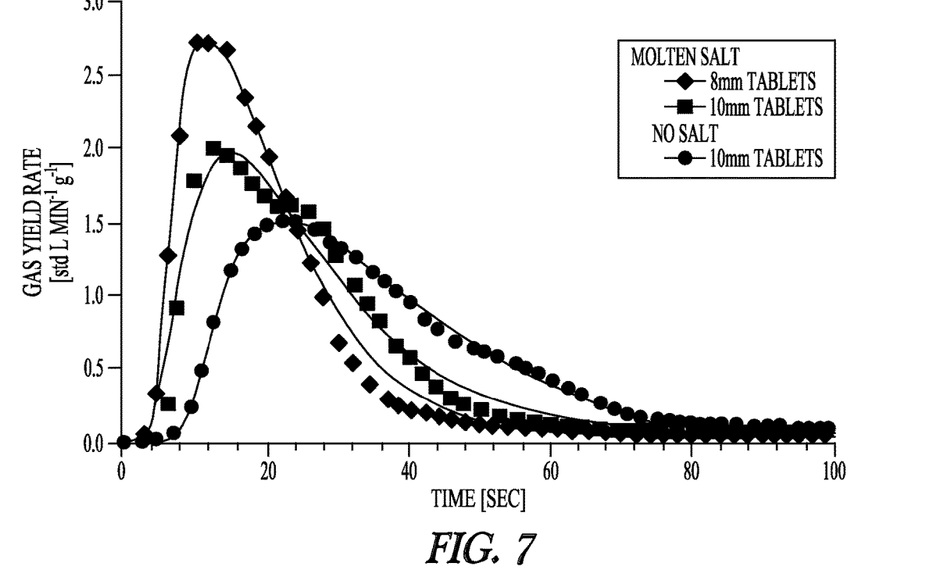
FIG. 7 shows data and simulations of pyrolysis of cellulose tablets.

Data and the best fit model for pyrolysis of cellulose tablets at 1235 K are shown in FIG. 7. Data for other temperatures and tablet sizes show similar trends. The reported yield rates have a propagated uncertainty of about ±0.09 std L/min-g, primarily due to the uncertainty of the reference argon gas flow rate. The predicted yield rates are in excellent agreement with the data with average error of 0.1 std L/min-g between the simulations and data.

Figure 8:
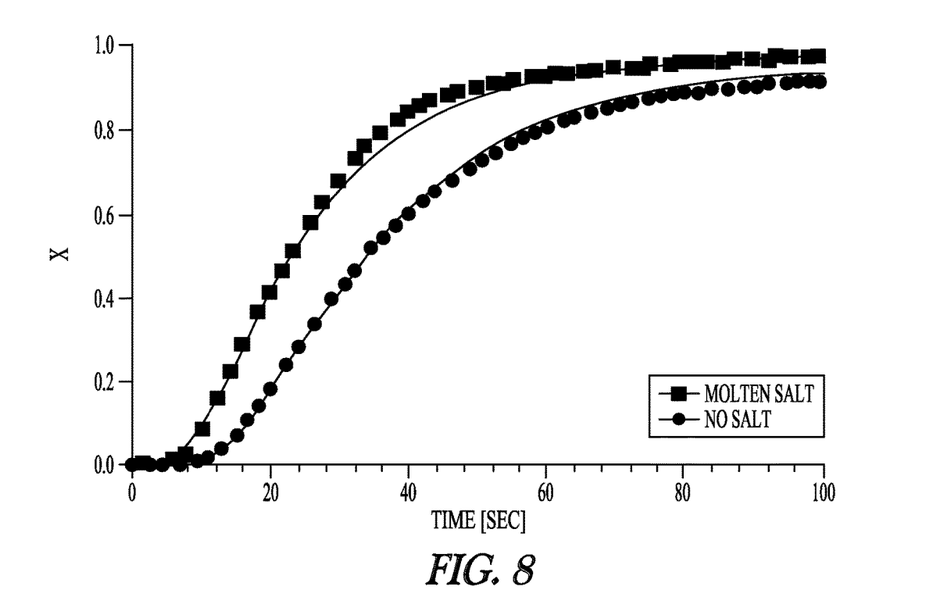
FIG. 8 shows cumulative conversion for 10 mm diameter cellulose tablets undergoing pyrolysis.

As shown in FIG. 7, the presence of molten salt provides a faster rise to the peak yield rate. For the 10 mm tablets at 1235 K, the maximum yield rate is 2 std L/min-g reached in 15 seconds. Without salt, the maximum rate is 1.5 std L/min-g after 25 seconds. FIG. 7 also illustrates that a carbon conversion of 95% is achieved in 50 seconds with salt as compared to 80 seconds without salt. This rate corresponds to a 74% increase in the reactivity index from a value of 0.94 l/min to 1.6 l/min. As predicted by the model, the benefits of the salt are due to the enhanced convective heat transfer. FIG. 7 compares the yield rates obtained for two different tablet sizes in the case with salt present. The 8 mm tablet exhibits a faster reaction as expected for a heat transfer limited process. The reaction model predicts the data for both tablet sizes indicating that the kinetic parameters determined for the pyrolysis reaction in molten salt are decoupled from the heat transfer behavior. FIG. 8 further illustrates the increase in reaction rate by displaying the cumulative extent of carbon conversion, X, for pyrolysis of 10 mm diameter cellulose tablets at 1235 K. The time lag between the two reactions grows from around 10 seconds at low conversion to a maximum of 30 seconds as the reaction completes.

The kinetic parameters are listed in Table 3:

TABLE 3

Average and Standard Deviation of Parameters Obtained for Flash Pyrolysis of Cellulose by Optimization of the Numeric Model. (Values 238, 22, and 26 fixed).

| Conditions | | $\ln(K_{0,p} \times [sec])$ | $E_p$ [kJ/mol] | $h_{conv}$ [W/m$^2$ · K] |
|---|---|---|---|---|
| Without Salt | 8 mm | 26 ± 1 | 238 | 22 |
| | 10 mm | | | |
| With Salt | 8 mm | 26 | 26 ± 1 | 410 ± 1 |
| | 10 mm | | | 424 ± 8 |

The data are well represented by the uncatalyzed reaction parameters. This result suggests that the increased rates of flash pyrolysis with molten salt are due to enhanced heat transfer and not catalysis. The enhanced heat transfer in the presence of the salt results in data best represented by convective heat transfer coefficients of 424 and 480 W/m$^2$-K for the 10 mm and 8 mm tablets respectively, somewhat larger than the initial estimated value of 400 W/m$^2$-K. This result is in agreement with a previous fluoroscopic study that reports the formation of a product gas layer separating high temperature melts and solids undergoing devolitization or pyrolysis. This separation can prevent sufficient contact between the solid and melt for catalysis to occur. Thus catalysis of the pyrolysis reaction is only expected when the feedstock is heated slowly within the salt or when the salt is impregnated into the feedstock as was the case of a previous study claiming catalysis.

Nomenclature
C Specific heat capacity [kJ/kg]
E Reaction activation energy [kJ/mol]
f Objective error function [std L/min-g]
Δh Molar specific enthalpy of reaction [kJ/mol]
ΔH Mass specific enthalpy of reaction [kJ/kg]
I Mass spectrometer signal intensity [Amps]
k Rate constant [1/min], [1/sec] or Thermal conductivity [W/m$^2$-K]
l Feedstock tablet thickness [mm]
m Mass [g], [kg]
n Order of reaction with respect to mass [−]
Nu Nusselt number [−]
P Absolute pressure [atm]
Pr Prandtl number
$\dot{R}$ Specific reaction rate [kg/m$^3$-s]
R Universal gas constant, 8.314 [J/mol-K]
RF Calibrated response factor with respect to argon [−]
r Radial coordinate position [m]
T Temperature [K]
t Time [sec], [min]
u Gas velocity [m/s]
$\dot{V}$ Volumetric flow rate [m$^3$/s], [std L/min]
V Volume [m$^3$]
z Axial coordinate position [m]
Greek
ε Total hemispherical emissivity [−]
φ Porosity [−]
ρ Density [kg/m$^3$]
τ Reactivity index [1/hr], [1/min]
Subscripts
0 Pre-exponential term or initial condition value
Ar Argon
C Carbon
CO Carbon Monoxide
CO$_2$ Carbon Dioxide
CH$_4$ Methane
cell Cellulose
conv Convective component
eff Effective value accounting for radiation effects
fit Pertaining to the fit of simulated data
GM Shrinking grain model of carbon gasification
(g) Gaseous phase
g Pertaining to the carbon gasification reaction
max Maximum mass of carbon possible form complete pyrolysis of cellulose present.
model Value obtained from a simulation model
o Outermost radial position
p Pertaining to the pyrolysis reaction
r Radial coordinate direction
rad Radiation component
(s) Solid phase
std Standard flow conditions of 1 [atm], 273 [K]
tot Combining effects of convection and radiation
z Axial coordinate direction
∞ Bulk salt melt temperature Additional Notes Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading can occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Although the invention has been described with reference to specific example embodiments, it will be evident that various modifications and changes can be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this invention. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This invention is intended to cover any and all adaptations or variations of various embodiments. Combinations of the above embodiments, and other embodiments not specifically described herein, will be apparent to those of skill in the art upon reviewing the above description.

The Abstract of the Invention is provided to comply with 37 C.F.R. §1.72(b), requiring an abstract that will allow the reader to quickly ascertain the nature of the technical invention. It is submitted with the understanding that it will not be used to interpret or limit the scope or meaning of the claims. In addition, in the foregoing Detailed Description, it can be seen that various features are grouped together in a single embodiment for the purpose of streamlining the invention. This method of invention is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A solar gasifier comprising:
    a first wall delineating a reaction chamber configured to hold a catalyst and a reactant, the reaction chamber being cylindrical and extending along a longitudinal axis from a first end to a second end, the longitudinal axis horizontally disposed;
    a reactant inlet port fluidly connected to the reaction chamber;
    a product outlet port fluidly connected to the reaction chamber; and
    a second wall located within the reaction chamber and delineating a heating chamber configured to receive light, the heating chamber extending along the longitudinal axis from the first end to the second end, the second wall preventing the catalyst and the reactant from entering the heating chamber, wherein at least a portion of the heating chamber is positioned within the reaction chamber such that a heat flow from the heating chamber into a portion of the reaction chamber holding the catalyst and the reactant results in an upward flow of the catalyst and the reactant proximate an exterior surface of the second wall and in a downward flow of the catalyst and the reactant proximate an interior surface of the first wall.

2. The solar gasifier of claim 1, wherein the catalyst comprises a molten alkali carbonate salt.

3. The solar gasifier of claim 1, wherein the catalyst comprises lithium carbonate, potassium carbonate, sodium carbonate, or a combination thereof.

4. The solar gasifier of claim 1, wherein the catalyst has a melting point of about 650 K to about 800 K.

5. The solar gasifier of claim 1, wherein the heating chamber is configured to pass heat upwardly into at least a portion of the reaction chamber.

6. The solar gasifier of claim 1, further comprising a steam or catalyst inlet port fluidly connected to the reaction chamber.

7. The solar gasifier of claim 1, further comprising a windowless aperture delineated by the reaction chamber and configured to permit passage of the received light into the heating chamber.

8. The solar gasifier of claim 1, further comprising a surface or window configured to permit passage of the received light into the heating chamber.

9. The solar gasifier of claim 1, wherein the reactant comprises biomass.

10. The solar gasifier of claim 1, wherein a product of the reactant comprises syngas.

11. The solar gasifier of claim 1, wherein the reaction chamber encompasses a cylindrical portion of the heating chamber.

12. A solar gasifier comprising:
- a heating chamber defined by a first plurality of walls and configured to receive light, wherein the heating chamber has a longitudinal axis disposed horizontally;
- a reaction chamber defined by a second plurality of walls, the reaction chamber including a molten salt, the reaction chamber extending along a length of the heating chamber along the longitudinal axis and partially encompassing at least a portion of the heating chamber such that a heat flow from the heating chamber into a portion of the reaction chamber holding the molten salt results in an upward flow of the molten salt proximate an exterior surface of the heating chamber and in a downward flow of the molten salt proximate an interior surface of the reaction chamber while maintain separation of the molten salt and the heating chamber;
- a reactant inlet port in fluid communication with a bottom portion the reaction chamber; and
- a product outlet port in fluid communication with a top portion of the reaction chamber.

13. The solar gasifier of claim 12, further comprising a steam or catalyst inlet port in fluid communication with the bottom portion of the reaction chamber.

14. The solar gasifier of claim 12, wherein the first plurality of walls of the reaction chamber are arranged in an annular geometry with the heating chamber.

15. The solar gasifier of claim 12, further comprising a surface or window configured to permit passage of the received light into the heating chamber.

16. The solar gasifier of claim 12, wherein the reactant comprises at least one of biomass, coal, solid waste, carbonaceous material.

17. The solar gasifier of claim 12, wherein the product comprises syngas.

18. The solar gasifier of claim 12, wherein the heating chamber is configured to permit solar heat generated by the heating chamber to pass upwardly into at least a portion of the reactant held by the reaction chamber.

19. The solar gasifier of claim 12, wherein the molten salt has a melting point of about 600 K to about 800 K.

20. A solar gasification system comprising:
- a feedstock supply conduit;
- a solar concentration apparatus; and
- a solar gasifier, comprising:
  - a heating chamber delineated by a cylindrical portion and a first end wall located at a first end of the cylindrical portion and a second end wall located at a second end of the cylindrical portion, the heating configured to receive light from the solar concentration apparatus through an windowless aperture defined by the first end wall, wherein the heating chamber has a longitudinal axis disposed horizontally when the gasifier is in use;
  - a reaction chamber defined by a plurality of walls that separate a molten salt located within the reaction chamber from the heating chamber, the reaction chamber extending along the longitudinal axis from the first end wall to the second end wall and encompassing the cylindrical portion of the heating chamber such that a heat flow from the heating chamber into a portion of the reaction chamber holding the molten salt results in an upward flow of the molten salt proximate an exterior surface of the heating chamber and in a downward flow of the molten salt proximate an interior surface of the reaction chamber; and
  - a feedstock inlet port in fluid communication with a bottom portion of the reaction chamber configured to receive the feedstock supply conduit;
  - a product outlet port in fluid communication with a top portion of the reaction chamber.

* * * * *

UNITED STATES PATENT AND TRADEMARK OFFICE
CERTIFICATE OF CORRECTION

PATENT NO.         : 9,605,219 B2
APPLICATION NO.    : 13/762075
DATED              : March 28, 2017
INVENTOR(S)        : Hathaway et al.

It is certified that error appears in the above-identified patent and that said Letters Patent is hereby corrected as shown below:

In Column 12, Line 16, delete "$T(r,z,0)=300K,\phi(r,z,0)=\phi_0$" and insert --$T(r,z,0)=300K, \phi(r,z,0)=\phi_0$-- therefor In Column 16, Line 18, delete "devolitization" and insert --devolatilization-- therefor Signed and Sealed this
Thirty-first Day of July, 2018

Andrei Iancu
*Director of the United States Patent and Trademark Office*